US008461285B2

(12) United States Patent
Ahmadnian et al.

(10) Patent No.: US 8,461,285 B2
(45) Date of Patent: Jun. 11, 2013

(54) PROCESS FOR PREPARING POLYETHER POLYOLS

(75) Inventors: Fatemeh Ahmadnian, Berlin (DE); Vinit Chilekar, Mannheim (DE); Andreas Brodhagen, Tiefenthal (DE); Achim Loeffler, Speyer (DE); Hermann Graf, Mutterstadt (DE)

(73) Assignee: BASF SE, Ludwigshafen (DE)

( * ) Notice: Subject to any disclaimer, the term of this patent is extended or adjusted under 35 U.S.C. 154(b) by 2 days.

(21) Appl. No.: 13/042,780

(22) Filed: Mar. 8, 2011

(65) Prior Publication Data

US 2011/0224396 A1 Sep. 15, 2011

Related U.S. Application Data

(60) Provisional application No. 61/311,783, filed on Mar. 9, 2010.

(51) Int. Cl.
*C08G 18/32* (2006.01)
*C07C 43/13* (2006.01)

(52) U.S. Cl.
USPC .......................................... 528/76; 568/620

(58) Field of Classification Search
None
See application file for complete search history.

(56) References Cited

U.S. PATENT DOCUMENTS

| | | | | |
|---|---|---|---|---|
| 6,673,972 | B2 * | 1/2004 | Ostrowski et al. | 568/620 |
| 6,822,005 | B2 * | 11/2004 | Font Freide et al. | 518/712 |
| 7,012,164 | B2 * | 3/2006 | Yamada et al. | 568/620 |
| 7,015,364 | B2 * | 3/2006 | Grosch et al. | 568/613 |
| 2005/0107643 | A1 * | 5/2005 | Ostrowski et al. | 568/679 |
| 2007/0276099 | A1 * | 11/2007 | Lorenz et al. | 525/438 |

FOREIGN PATENT DOCUMENTS

DE 103 22 784 A1 12/2004

OTHER PUBLICATIONS

U.S. Appl. No. 13/084,805, filed Apr. 12, 2011, Ahmadnian, et al.

* cited by examiner

*Primary Examiner* — Randy Gulakowski
*Assistant Examiner* — Jeffrey Washville
(74) *Attorney, Agent, or Firm* — Oblon, Spivak, McClelland, Maier & Neustadt, L.L.P.

(57) ABSTRACT

The present invention relates to a process for the catalytic preparation of polyetherols, wherein the power input by means of at least one stirrer and/or by means of at least one pump, based on the reactor volume, is in the range from 0.001 to 8.2 $kW/m^3$.

6 Claims, No Drawings

PROCESS FOR PREPARING POLYETHER POLYOLS

INTRODUCTION

The present invention relates to a process for preparing polyether polyols (PEOLs) using defined stirring power inputs in order to achieve high batch-to-batch consistency.

BACKGROUND

The preparation of polyether alcohols is described in M. Ionescu, "Chemistry and technology of polyols for polyurethanes", Rapra Technology, 2005.

Frequently used alkylene oxide starting materials for the preparation of polyether alcohols are propylene oxide (PO) and/or ethylene oxide (EO).

In the preparation of PEOLs, in particular in the batchwise preparation, variations from batch to batch occur every now and again. The variations are noticeable in flexible foam polyols, especially in the concentration of the unsaturated monools and the molecular weight distribution, and have an effect on the processing and the mechanical properties of the polyurethanes produced therefrom. In the case of rigid foam polyols, excessively high sugar concentrations are often observed and cause deposits on the foaming machines in the processing of polyurethanes. If, for the purposes of quality control, Shewhart control cards are used to check the production process, infringements of the six sigma rule and the trend rules, for example the Western Electric rule, occur. The procedure is described, for example, in Douglas C. Montgomery, Introduction to Statistical Quality Control, 6th edition 2008, Wiley & Sons, New York, ISBN 0470169923. Deviations from these rules indicate that systematic, not random, fluctuations are present in the process, which means that the production process is incompletely controlled.

These problems can in many cases be attributed to insufficient mixing of the contents of the reactor.

Insufficient mixing also results in the following disadvantages:

a) the alkylene oxide which is present in gaseous form under the customary reaction conditions does not come into contact uniformly with all reactants, i.e. essentially the starters, which results in discrimination in the buildup of the chain and thus fluctuating product properties, b) gas/liquid mass transfer is made more difficult, which causes increased reaction and reactor occupation times, c) heat transfer is hindered; if this is not taken into account in the mode of operation, undesirable overheating of the reaction mixture, in particular local overheating, occurs, or when it is taken into account, the rate of introduction of alkylene oxide has to be reduced, which increases the reaction time and thus the reactor occupation time, d) in the case of overheating due to c), when a DMC catalyst is used it can be partially or completely deactivated; particularly in the case of KOH catalysis, the content of unsaturated constituents, viz. monools, can increase;

e) in the case of sugar polyols, the residual sugar content in the finished polyol can be increased and cause turbidity of the product, f) in addition, overheating can lead to an unstable operating state, which in the extreme case can result in a runaway reaction.

The problems mentioned have hitherto not been solved satisfactorily in the available literature, e.g. in M. Ionescu, Chemistry and Technology of Polyols for Polyurethanes, Rapra Technology Limited, Shawbury/UK, 2005, p. 336 ff., and in M. Baerns, A. Behr, A. Brehm, J. Gmehling, H. Hofmann, U. Onken, Ullmann's Encyclopedia of Industrial Chemistry, New York, 5th ed., Vol. A21, p. 665.

It is therefore an object of the invention to provide a process for preparing polyether polyols which avoids the abovementioned disadvantages as far as possible.

DESCRIPTION OF THE INVENTION

The stated object is achieved by the process of the invention for preparing polyether polyols by using defined stirring power inputs as indicated, in particular, in the claims.

The above-described problems which occur in conventional processes are avoided by the process of the invention for preparing polyether polyols (PEOLs) using defined stirring power inputs. This enables a high batch-to-batch consistency to be ensured, i.e. the parameters of OH number and viscosity which are important for polyether polyols vary only slightly from batch to batch.

The invention accordingly provides a process for the catalytic preparation of polyetherols, wherein the power input by means of at least one stirrer and/or by means of at least one pump, based on the reactor volume, is in the range from 0.001 to 8.2 $kW/m^3$.

According to the process disclosed here, adequate mixing of the reaction mixture is ensured in the production process. Mixing can be achieved by stirring or circulation by pumping or by a combination of stirring and circulation by pumping. Criteria for good mixing are the power input based on the reactor volume and the pump circulation rate, with the latter also being able to be expressed as equivalent power input.

A) Starting Materials:

Examples of possible starters for the process are the following:

a) monohydric and polyhydric alcohols having a functionality F=1-8, for example MEG (monoethylene glycol), DEG (diethylene glycol), TEG (triethylene glycol), PEG (polyethylene glycol); MPG (monopropylene glycol), DPG (dipropylene glycol), TPG (tripropylene glycol), PPG (polypropylene glycol); PTHF (polytetrahydrofuran), glycerol, glycerol alkoxylate having a molar mass of <10 000, TMP (trimethylolpropane), TME, (trimethylolethane), NPG (neopentyl glycol), allyl alcohol alkoxylate having a molar mass of <1000, sugars and sugar derivatives such as sucrose or sorbitol, bisphenol A, bisphenol F, pentaerythritol, degraded starch, water, mixtures thereof, b) monofunctional and polyfunctional amines such as ethylenediamine, triethanolamine or toluenediamine, c) hydroxycarboxylic acids, hydroxyaldehydes, hydroxyketones; tridecanol N and polymers thereof; esters of acrylic acid and methacrylic acid with bifunctional alcohols, e.g. HEA (hydroxyethyl acrylate), HPA (hydroxypropyl acrylate), HEMA (hydroxyethyl methacrylate), HPMA (hydroxypropyl methacrylate), vinyl ethers such as HBVE (hydroxybutyl vinyl ether); isoprenol; polyesterols; lower alkoxylates of the abovementioned starters, in particular sucrose, sobitol; polyesterols, d) vegetable oils having hydroxyl groups, e.g. castor oil, or vegetable oils into which hydroxyl groups have been introduced by chemical modification, e.g. soybean oil.

The starters can be placed in the reactor at the beginning of the reaction or, if appropriate, can also be metered in during the process, which can be total or partial.

As alkylene oxide, preference is given to using propylene oxide, ethylene oxide, butylene oxide, isobutylene oxide, styrene oxide or mixtures of at least two of the alkylene oxides mentioned. Preference is given to using propylene oxide, ethylene oxide or mixtures of propylene oxide and ethylene oxide as alkylene oxide. Propylene oxide is particularly preferably used as alkylene oxide.

The process can be carried out as a random or block copolymerization using different alkylene oxides.

As catalysts, use is usually made of basic compounds. These are usually tertiary amines and/or hydroxides of alkali metals and alkaline earth metals. Examples of amine catalysts are trimethylamine (TMA), tributylamine, triethylamine (TEA), dimethylethanolamine (DMEOA) and dimethylcyclohexylamine (DMCHA), imidazole and substituted imidazole derivatives, preferably dimethylethanolamine. Examples of hydroxides are potassium hydroxide, sodium hydroxide, strontium hydroxide, cesium hydroxide and calcium hydroxide. In one embodiment, preference is given to using KOH as catalyst.

It is also possible to use a catalyst from the group of multimetal cyanide catalysts; preference is given here to catalysts from the group of dimetal cyanide catalysts (DMC catalysts).

The catalysts mentioned can be used individually or in admixture with one another. It is possible in the case of a continuous backmixed reactor and a further reactor to use the same or different catalysts.

The total amount of the catalyst can be added at the beginning of the reaction or the catalyst can be introduced in portions over the reaction time.

The process of the invention can be carried out as a batch, semibatch or continuous process.

B) Apparatuses:

Information on these may be found, for example, in M. Ionescu, Chemistry and Technology of Polyols for Polyurethanes, Rapra Technology Limited, Shawbury/UK, 2005, p. 336 ff., and in M. Baerns, A. Behr, A. Brehm, J. Gmehling, H. Hofmann, U. Onken, Ullmann's Encyclopedia of Industrial Chemistry, New York, 5th ed., Vol. A21, p. 665.

For example, the process of the invention can be carried out in a stirred vessel, with the stirred vessel being able to be equipped with at least one internal heat exchanger and/or at least one external heat exchanger.

C) Power Input:

The specific power input, in $kW/m^3$, based on the reactor volume, is calculated as a function of the stirrer type, stirrer dimensions, reactor dimensions, viscosity of the reaction mixture and the speed of rotation in the presence of baffles by the method of M. Zlokarnik, Rührtechnik, Theorie and Praxis, Springer Verlag Berlin 1999, as follows:

$$P=Ne*n^3*d^5*\rho \quad \text{(formula 1)},$$

where Ne is the Newton number, n is the stirrer speed (in rpm), d is the stirrer diameter and ρ is the density of the contents of the reactor. The Newton number can be taken from the book by Zlokarnik (pp. 75-78).

As an alternative, the power input can be determined from the pumped circulation rate (in $m^3/h$), based on the reactor volume (in $m^3$), accordingly in $m^3/h/m^3$, as follows:

$$P=\Delta p*\dot{m} \quad \text{(formula 2)},$$

where Δp is the pressure drop between the pump outlet and inlet into the reactor (in Pa) and ṁ is the flow rate (in $m^3/s$).

The pump circulation rate can thus also be expressed as a power input; when, for example, the pump circulation rate, based on the reactor volume, is within the range according to the invention from 3 to 150 $m^3/h/m^3$, preferably from 4 to 100 $m^3/h/m^3$, very preferably from 5 to 80 $m^3/h/m^3$, then the power input by the indicated circulation by pumping, based on the reactor volume, is in the range from 0.001 to 1 $kW/m^3$, preferably from 0.002 to 0.5 $kW/m^3$, very particularly preferably from 0.003 to 0.25 $kW/m^3$.

The introduction of the stirring power can be effected either by the stirrer or by circulation by pumping or both by stirring and circulation by pumping and be effected in one way or the other way, if appropriate alternately, during the course of the reaction, depending on what the reaction conditions require.

Particularly when the fill level of the reactor is low, i.e. at the beginning of the alkoxylation reaction, it can be necessary to carry out mixing in only one of the ways mentioned and later modify the stirrer speed or pump circulation rate.

Particularly in the case of a stirrer being employed, a baffle can additionally be used. Baffles are flow-disrupting internals in stirred vessels. They prevent rotation of the fluid moved by the central stirrer together with the stirrer in the stirred vessel and are generally installed at the wall of the vessel.

The process of the invention for the catalytic preparation of polyetherols can thus be carried out using at least one baffle.

The process of the invention for the catalytic preparation of polyetherols can also be carried out using no baffle and no pump, with the power input by at least one stirrer, based on the reactor volume, being in the range from 0.36 to 7.2 $kW/m^3$, preferably from 1.2 to 4.8 $kW/m^3$, particularly preferably from 1.44 to 4.2 $kW/m^3$.

The process of the invention for the catalytic preparation of polyetherols can also be carried out using at least one baffle and no pump and with the power input by at least one stirrer, based on the reactor volume, being in the range from 0.3 to 6 $kW/m^3$, preferably from 1 to 4 $kW/m^3$, particularly preferably from 1.2 to 3.5 $kW/m^3$.

The process of the invention for the catalytic preparation of polyetherols can also be carried out using no stirrer and with the power input by at least one pump, based on the reactor volume, being in the range from 0.001 to 1 $kW/m^3$, preferably from 0.002 to 0.5 $kW/m^3$, particularly preferably from 0.003 to 0.25 $kW/m^3$.

The process of the invention for the catalytic preparation of polyetherols can also be carried out using no baffle and with the combined power input by at least one stirrer and at least one pump, based on the reactor volume, being in the range from 0.361 to 8.2 $kW/m^3$, preferably from 1.2002 to 5.3 $kW/m^3$, particularly preferably from 1.443 to 4.45 $kW/m^3$.

The process of the invention for the catalytic preparation of polyetherols can also be carried out using at least one baffle and with the combined power input by at least one stirrer and at least one pump, based on the reactor volume, being in the range from 0.3001 to 7 $kW/m^3$, preferably from 1.002 to 4.5 $kW/m^3$, particularly preferably from 1.203 to 3.75 $kW/m^3$.

The reaction of the starter substance with the alkylene oxides is generally carried out at the customary pressures in the range from 0.1 to 1.0 MPa and the customary temperatures in the range from 80 to 140° C. The introduction of the alkylene oxides is usually followed by an after-reaction phase in order for the alkylene oxides to react completely. The crude polyether alcohol obtained in this way is freed of unreacted alkylene oxide and volatile compounds by distillation, preferably under reduced pressure, dewatered and worked up by neutralization of acid and removal of the salts formed.

When amines are used as catalysts, these can remain in the polyol. This also applies to DMC catalysts.

The present invention also provides polyetherols which can be prepared by the process of the invention for the catalytic preparation of polyetherols.

The polyetherols which can be prepared by the process of invention for the catalytic preparation of polyetherols are preferably used for producing polyurethanes, preferably by reaction with polyisocyanates.

EXAMPLES

Some examples to illustrate the invention are presented below. These examples do not in any way restrict the scope of protection of the present invention; they are purely illustrative.

1) Synthesis of a flexible foam polyol [L 2090, BSW]

2.4 g of glycerol were placed in an enameled 300 ml stainless steel autoclave which had two four-blade stirrers installed at different levels on the stirrer shaft as stirring device and also a baffle, 1.33 g of 45 percent aqueous potassium hydroxide solution were added, the vessel was closed and heated to 110° C. while stirring. 169.4 g of pure propylene oxide were metered in at 110-115° C. via a pressure line over a period of about 5 hours. The mixture was subsequently allowed to react further for 2 hours. The autoclave was then vented, flushed with nitrogen for 5 minutes and a pressure of 1 bar was set by means of nitrogen. 28.2 g of pure ethylene oxide were then introduced at 110-115° C. over a period of 0.5 hours and the mixture was allowed to react further for the same time. The potassium hydroxide used was then neutralized with hydrochloric acid. Vacuum was subsequently applied and a gentle stream of nitrogen was introduced at the same time. The mixture was then pumped through a plate filter. The OH number, the viscosity and the iodine number were determined on the finished product.

a) Experiment Using a Low Stirring Power Input:

The above-described alkoxylation was carried out using a stirrer speed of 547 revolutions per minute (rpm), corresponding to a specific stirring power of 0.3 kW/$m^3$ at a viscosity of the reaction mixture of 50 mPa*s.

b) Experiment Using a High Stirring Power Input:

Experiment a) was carried out at 1400 rpm, corresponding to a specific stirring power of 3.5 kW/$m^3$ at a viscosity of the reaction mixture of 50 mPa*s.

Analytical Values:

| | Experiment 1a) | Experiment 1b) |
|---|---|---|
| OH number [mg KOH/g] | 29.7 | 28 |
| Viscosity [mPa * s, 25° C.] | 1020 | 1130 |
| Iodine number [g of $I_2$/100 g] | 2.5 | 1.8 |

The analyses were carried out by the following methods:

OH number: DIN 53240-2 (DIN=deutsche Industrienorm [German industrial standard])

Iodine number: DIN 53241-1, or DGF-V11/B (DGF=deutsche Gesellschaft für Fettwissenschaft [German society for fat science])

Viscosity: DIN 53019-1

2) Synthesis of a rigid foam polyol [analogous to example 1 in DE 10322784, p. 8]

35.3 g of glycerol were placed in a 300 ml stainless steel autoclave which had two four-blade stirrers installed at different levels on the stirrer shaft as stirring device and also a baffle, heated to 90° C., 1.33 g of N,N-dimethylcyclohexylamine, 0.240 g of 48 percent potassium hydroxide solution and 53.8 g of sucrose powder were introduced and the whole was mixed by stirring. 200 g of propylene oxide were subsequently introduced in such a way that the pressure did not exceed 7 bar. The temperature was allowed to rise to 115° C. This was followed by an after-reaction phase of 5 hours at 115° C. Vacuum was then applied for 30 minutes and the mixture was neutralized and filtered.

a) Experiment Using a Low Stirring Power Input:

The above-described alkoxylation was carried out using a stirrer speed of 116 revolutions per minute (rpm), corresponding to a specific stirring power of 0.3 kW/$m^3$ at a viscosity of the reaction mixture of 2000 mPa*s.

b) Experiment Using a High Stirring Power Input:

Experiment b) was carried out at 397 rpm, corresponding to a specific stirring power of 3.5 kW/$m^3$ at a viscosity of the reaction mixture of 2000 mPa*s.

Analytical Values:

| | Experiment 2a) | Experiment 2b) |
|---|---|---|
| OH number [mg KOH/g] | 480 | 492 |
| Viscosity [mPa * s, 25° C.] | 9250 | 9830 |
| Residual sucrose [g/100 g] | 0.12 | <0.05 |

3) Synthesis of a rigid foam polyol using various pump circulation rates [analogous to example 1 in DE 10322784, p. 8]

The synthesis of the rigid foam polyol described under 2) was repeated but mixing was effected not by stirring but by circulation by pumping.

a) Experiment Using a Low Pump Circulation Rate

The above-described alkylation was carried out using a pump circulation rate of 5 $m^3$/h/$m^3$, corresponding to a power input of 0.003 kW/$m^3$.

b) Experiment Using a High Pumped Circulation Rate

The experiment was carried out as described under a) but using a pump circulation rate of 80 $m^3$/h/$m^3$, which equates to a power input of 0.25 kW/$m^3$.

Analytical Values:

| | Experiment 3a) | Experiment 3b) |
|---|---|---|
| OH number [mg KOH/g] | 475 | 492 |
| Viscosity [mPa * s, 25° C.] | 9180 | 9830 |
| Residual sucrose [g/100 g] | 0.14 | <0.05 |

From the experimental results, it can be deduced, inter alia, that the content of unsaturated constituents, which is indicated by the iodine number, or the residual sugar content is lower at the defined stirring power inputs, in particular the relatively high stirring power inputs. In addition, a narrower molar mass distribution can be achieved when the process of the invention is employed, as can be seen from the lower viscosities.

The examples thus show the superiority of the present process compared to the conventional processes.

The invention claimed is:

1. A process comprising catalytically preparing a polyetherol in a reactor comprising at least one pump and no stirrer, wherein power is input by the pump, based on the reactor volume, in a range from 0.001 to 1 kW/$m^3$, and which process is carried out in batch form.

2. The process according to claim 1, wherein at least one baffle is used.

3. A polyetherol prepared by the process according to claim 1.

4. A process for producing a polyurethane comprising reacting the polyetherol according to claim 3 with a polyisocyanate.

5. The process according to claim 1, wherein the range is from 0.002 to 0.5 $kW/m^3$.

6. The process according to claim 1, wherein the range is from 0.003 to 0.25 $kW/m^3$.

* * * * *